United States Patent
Kushner et al.

(10) Patent No.: US 7,819,483 B2
(45) Date of Patent: Oct. 26, 2010

(54) LEANING POST SEAT WITH A REMOVABLE SOFT-SIDED STORAGE COMPARTMENT

(76) Inventors: William Kushner, 98 NE. 179 St., Miami, FL (US) 33162; Terry Fisher, 98 NE. 179 St., Miami, FL (US) 33162

( * ) Notice: Subject to any disclaimer, the term of this patent is extended or adjusted under 35 U.S.C. 154(b) by 154 days.

(21) Appl. No.: 12/184,303

(22) Filed: Aug. 1, 2008

(65) Prior Publication Data

US 2009/0267388 A1 Oct. 29, 2009

Related U.S. Application Data

(63) Continuation of application No. 11/177,040, filed on Jul. 8, 2005, now Pat. No. 7,422,279.

(60) Provisional application No. 60/586,208, filed on Jul. 8, 2004.

(51) Int. Cl.
*A01K 97/22* (2006.01)

(52) U.S. Cl. ............... 297/452.2; 297/188.2; 297/313; 297/461; 114/363

(58) Field of Classification Search ............ 297/188.08, 297/188.12, 313, 337, 461, 462, 423.41, 297/452.18, 452.2; 114/363
See application file for complete search history.

(56) References Cited

U.S. PATENT DOCUMENTS

| 2,461,622 | A | * | 2/1949 | Alikas ...................... 248/628 |
| 3,393,940 | A | * | 7/1968 | Ellsworth et al. ...... 297/423.41 |
| 4,428,617 | A | * | 1/1984 | Lawson ................... 297/188.2 |
| 4,690,457 | A | * | 9/1987 | Poncy et al. ................. 297/337 |
| 6,375,258 | B1 | * | 4/2002 | Fang ...................... 297/188.08 |
| 6,923,419 | B2 | * | 8/2005 | George et al. ............... 248/676 |
| 6,969,119 | B1 | * | 11/2005 | Jennings ................ 297/423.41 |
| 7,052,080 | B2 | * | 5/2006 | Knight et al. ................... 297/4 |

* cited by examiner

*Primary Examiner*—Peter R. Brown
(74) *Attorney, Agent, or Firm*—Robert M. Schwartz; Alfred K. Dassler

(57) ABSTRACT

A leaning post seat assembly includes a D-ring having a D-shape and a cross tube disposed in the D-ring for defining a rectangular boundary having long sides and short sides. Two side frames are removably attached at opposite ends of the D-ring and a crossbar is removably attached between the side frames. A seat cushion is pivotably attached to the crossbar and a soft-sided storage compartment is removably attached to the rectangular boundary.

8 Claims, 4 Drawing Sheets

LEANING POST SEAT WITH A REMOVABLE SOFT-SIDED STORAGE COMPARTMENT

CROSS-REFERENCE TO RELATED APPLICATIONS

This application is a continuation of U.S. Non-Provisional Application Ser. No. 11/177,040, filed on Jul. 8, 2005, entitled LEANING POST SEAT WITH SOFT FABRIC STORAGE COMPARTMENT which claims the benefit of U.S. Provisional Application Ser. No. 60/586,208, filed on Jul. 8, 2004, entitled LEANING POST SEAT WITH SOFT FABRIC STORAGE COMPARTMENT; the prior applications are herewith incorporated by reference in their entirety.

BACKGROUND OF THE INVENTION

1. Field of the Invention

The invention relates to a removable storage compartment for attaching to a frame, more specifically, to a soft-sided storage bag for a leaning post. The invention also relates to the leaning post seat.

2. Description of the Related Art

The present invention is a leaning post seat with soft fabric storage compartment. Leaning post seats are used generally in boats, and in particular for open fisherman style boats. These boats generally have a center console, a T-top and a seat that allows the driver to stand and lean against the seat while driving. The driver can also sit on the seat as well. The leaning post seat, well known in the art, is typically comprised of a metal or fiberglass structure and has cushions on the top of the structure which hang over to and the front portion of the structure so that the driver can lean against said front portion and come in contact with the seat cushion or the driver can sit on the seat cushion and come in contact with the cushion.

Leaning post seats are usually pre-fabricated at an assembly facility where the components thereof are welded together. This results in a rather bulky item that takes up a great deal of space during shipping, on display in a marine showroom floor, or in a storage facility.

Leaning post seats usually include a permanently mounted fiberglass storage compartment that is disposed under the seat. The fiberglass storage compartment allows for the storage of items that are to be kept relatively accessible and which are to remain dry. This construction of a storage compartment does not allow for the easy removal and transport of the storage compartment. The fact that the storage compartment is not removable means that any items left in the storage compartment while the boat are not secure and are susceptible to being stolen.

SUMMARY OF THE INVENTION

It is accordingly an object of the invention to provide storage compartment which overcomes the above-mentioned disadvantages of the heretofore-known devices of this general type and which provides a leaning post seat that is easy to assembly and has minimal space requirements during shipping and warehousing.

With the foregoing and other objects in view there is provided, in accordance with the invention a leaning post seat assembly includes a D-ring having a D-shape and a cross tube disposed in the D-ring and defining a rectangular boundary having long sides and short sides. Two side frames are removably attached at opposite ends of the D-ring. A crossbar is removably attached between the side frames. A seat cushion is pivotably attached to the crossbar and a soft-sided storage compartment is removably attached to the rectangular boundary.

In accordance with another feature of the invention, the compartment has a zipper and two zippered flaps the zipper attaching the zipper flaps to one another.

In accordance with a further feature of the invention, the compartment has longitudinal walls and lateral walls. Each of the longitudinal walls has a respective upper flap and a respective lower flap. The respective upper flap and the respective lower flap wrap around a respective one of the long sides of the D-ring and are attached to one another with releasable fasteners. Each of the lateral walls have a respective lateral flap, the respective lateral flap wraps around a respective one of short sides of the D-ring and attaches to the compartment with further releasable fasteners.

In accordance with an added feature of the invention, the compartment includes cover flaps disposed at ends of the zipper, the cover flaps prevent water from entering the compartment.

In accordance with an additional feature of the invention a rack rod is removably attached between the side frames opposite the crossbar. A footrest is removably attached between the side frames below the crossbar. A cooler strap is removably attached between the side frames opposite the footrest.

In accordance with another mode of the invention, the side frames each have a respective upper connecting plate, a respective lower connecting plate, a respective tab plate, and a respective second tab plate. The D-ring has two mounting plates disposed opposite each other, each of the mounting plates are bolted to one of the respective upper connecting plates. The footrest has two end plates disposed at opposite ends of the footrest. Each of the end plates are bolted to one of the respective tab plate, and the rack rod has two ear plates disposed at opposite ends of the rack rod. Each of the ear plates are bolted to one of the respective second tab plate.

In accordance with a further mode of the invention a cooler strap is attached between the side frames with eye straps.

In accordance with an additional mode of the invention, rack rod includes rod holders.

With the objects of the invention in view, there is also provided a removable soft-sided compartment for a leaning seat post, the leaning seat post has a rectangular boundary tube with long sides and short sides, the boundary tube is under a seat cushion. The compartment includes a bottom, two lateral walls disposed opposite one another and two longitudinal walls disposed opposite one another between the lateral walls. The longitudinal walls each have a respective upper flap and a respective lower flap. The upper and lower flaps wrap around the boundary tube and are connected with mating releasable fasteners for supporting the compartment on the leaning post seat. A zipper and two zipper flaps sealably attached to the longitudinal walls and attachable to one another with the zipper.

In accordance with yet another feature of the invention, the lateral walls each have a respective lateral flap. The respective flap wraps around the boundary tube and attaches to a respective one of the lateral walls with further releasable fasteners for supporting the compartment on the leaning post seat.

In accordance with yet a further feature of the invention, the lateral walls each have a respective cover flap attached thereto for preventing water from entering the compartment at ends of the zipper. The respective cover flap has additional releasable fasteners for attaching the respective cover flap to the zipper flaps.

In accordance with yet an added feature of the invention, the respective lateral flap has arms that are releasably attached to the longitudinal wall.

In accordance with yet an additional feature of the invention, a plurality of separate partition walls each are releasably attached to interior sides of the longitudinal walls for segmenting the compartment.

In accordance with still another feature of the invention, D-ring clips are disposed at the lateral wall and a carrying strap is attachable to the D-ring clips for carrying the compartment.

In accordance with yet a further feature of the invention, external zippered pouches are disposed on the lateral walls.

In accordance with an additional mode of the invention, internal pouches are disposed on an internal side of the lateral walls.

In accordance with an additional further mode of the invention, internal receptacles are disposed on an internal side of the longitudinal walls.

In accordance with yet a further mode of the invention, the longitudinal walls and the lateral walls define corners therebetween. The corners each have a respective support arm for supporting the compartment on the boundary tube.

In accordance with still a further mode of the invention, the respective support arm is pivotable for moving the support arm to stowed position above the compartment.

In accordance with another mode of the invention, the releasable fasteners and the further releasable fasteners are mating hook and loop pieces.

In accordance with yet another mode of the invention, the walls, and zippered flaps are formed of a flexible waterproof material.

Other features which are considered as characteristic for the invention are set forth in the appended claims.

Although the invention is illustrated and described herein as embodied in a soft sided storage compartment for a leaning post seat, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 4:
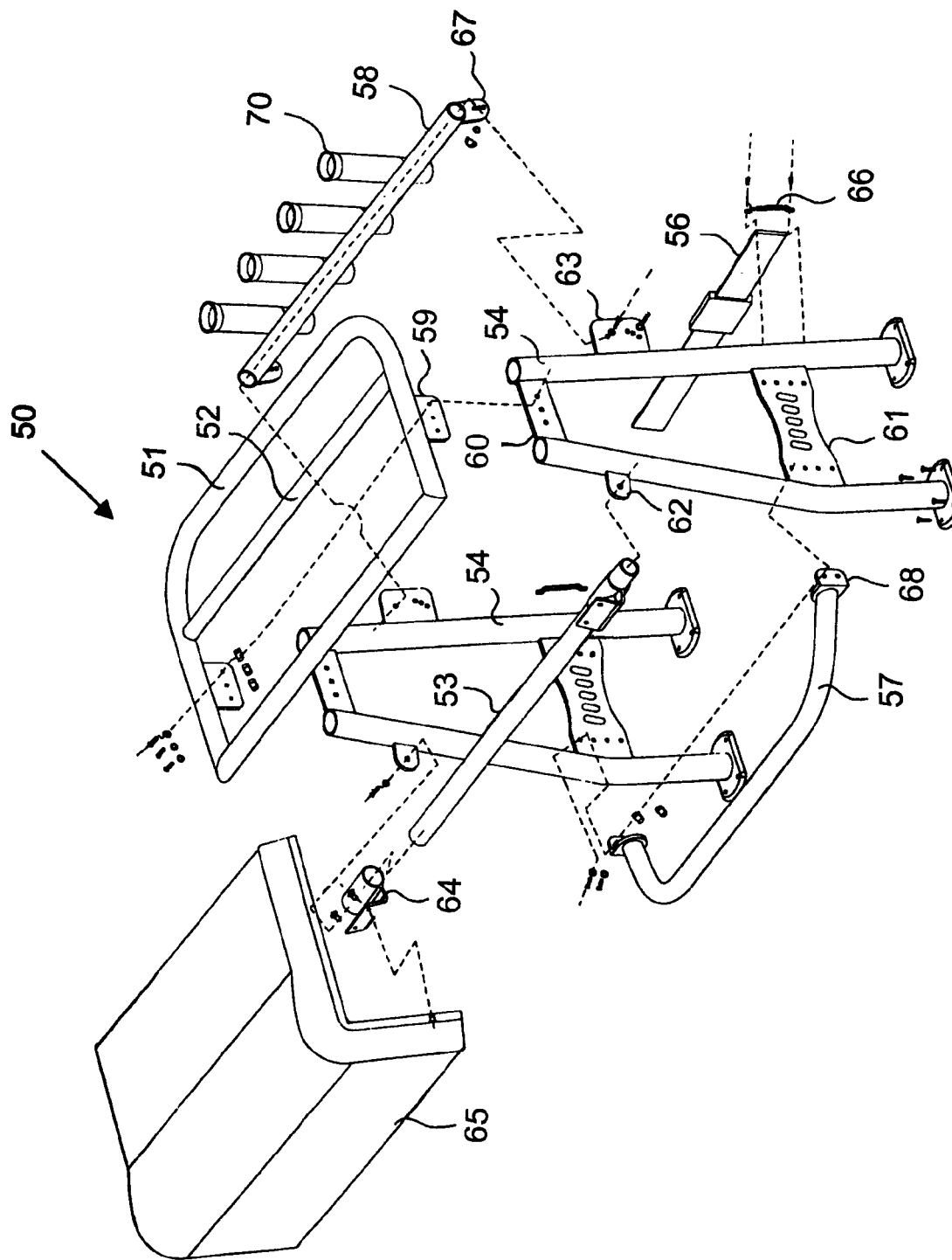
FIG. 4 is a perspective exploded view of the leaning post seat.

Referring now to the figures of the drawing in detail and first, particularly, to FIG. 4 thereof, there is seen a leaning post seat 50. The leaning post seat 50 includes a D-ring tube or boundary tube 51 including a cross tube 52 and mounting plates 59. The leaning post seat 50 has side frames 54 each having an upper connecting plate 60 and a lower connecting plate 61 for connecting legs of the side frames 54. The D-ring tube 51 is bolted on its ends to the side frames by the mounting plates 59 and the upper connecting plate 60.

The side frames each have a tab plate 62 and a second tab plate 63. A crossbar 53 is bolted between the side frames 54 using the tab plates 62. A footrest 57 has end plates 68 welded onto the ends of the footrest 57. The footrest 57 is disposed between the side frames 54 below the crossbar 53. The end plates 68 are bolted to the lower connecting plate 61 for holding the footrest 57 in place. A rack rod 58 has rod holders 70 and ear plates 67 welded to the ends of the rack rod 58. The rack rod is disposed between the side frames 54 opposite the crossbar 53. The ear plates 67 are bolted to the second tab plates 63 for holding the rack rod 58 in place. A cooler strap 56 is disposed opposite the footrest 57 between the side frames 54 and is held in place on the side frames 54 with eye straps 66.

Hinges 64 are disposed on the crossbar 53. An L-shaped seat cushion 65 is connected to the hinges 64. The seat cushion 65 pivots about the crossbar 53 on the hinges 64.

Figure 1:
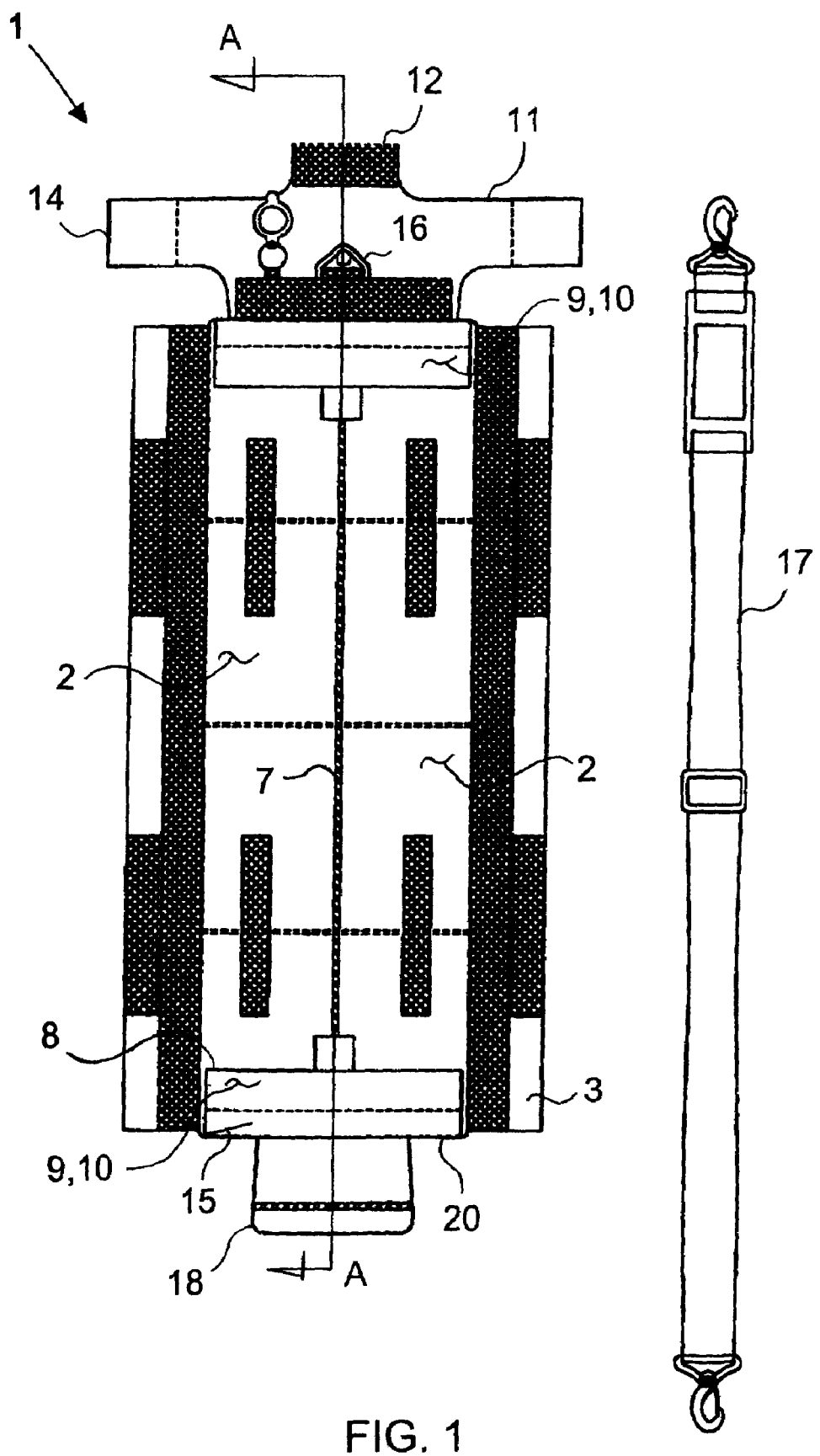
FIG. 1 is top plan view of the soft-sided storage compartment and the carrying strap in an unmounted state of the compartment.
Figure 3:
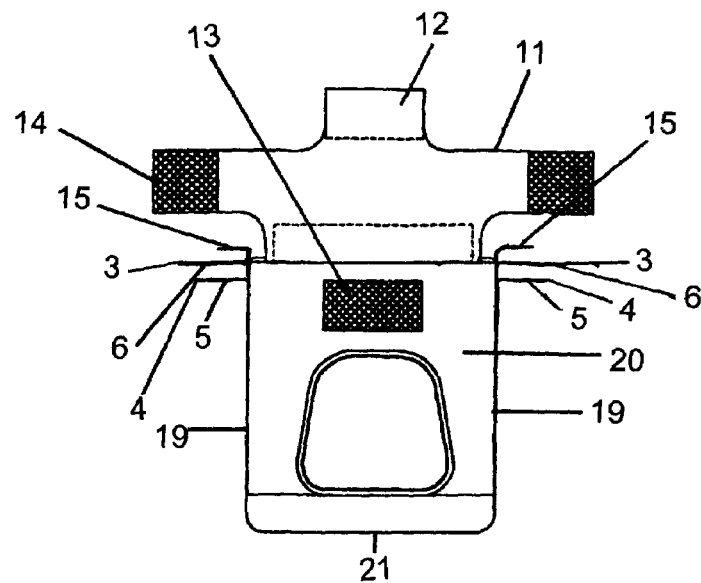
FIG. 3 is a side elevational view of the soft-sided storage compartment according to FIG. 1 in an unmounted state of the compartment.

Referring now to FIG. 1, there is seen part of a removable soft-sided storage compartment 1 which is made of a weather resistant and waterproof material. The compartment 1 is rectangular in shape and has two longitudinal walls 19 and two lateral walls 20. The compartment 1 includes a bottom 21 and two zippered flaps 2 for closing and sealing the compartment 1 with a zipper 7. The ends of the zipper 7 are covered by cover flaps 8, which serve to prevent water from entering the compartment along the edges of the zippered flaps 2 at the lateral walls 20. The cover flaps 8 are held against the zippered flaps 2 with mating releasable fasteners such as Velcro® or hook and loop strips 9 and 10.

An upper longitudinal mounting flap 3 is attached on the top of the compartment 1 on each of the longitudinal walls 19 of the compartment. A lower longitudinal mounting flap 4 is also attached on the top of the compartment 1 at each of the longitudinal walls 19 of the compartment 1. The upper longitudinal mounting flap 3 and the lower longitudinal flap each include mating hook and loop strips 5 and 6 that extend along their respective lengths. One set of the upper and lower longitudinal flaps 3 and 4 wrap around the straight side of the D-ring 51 and are secured to one another with the mating hook and loop strips 5 and 6, thereby connecting one side of upper and lower flaps 3 and 4 around straight side of the D-ring 51. In a similar manner, the other set of upper and lower longitudinal flaps 3 and 4 wrap around the cross tube 52 and are secured to one another with the mating hook and loop strips 5 and 6, thereby connecting the other set of upper and lower flaps 3 and 4 around the cross tube 52.

Figure 2:
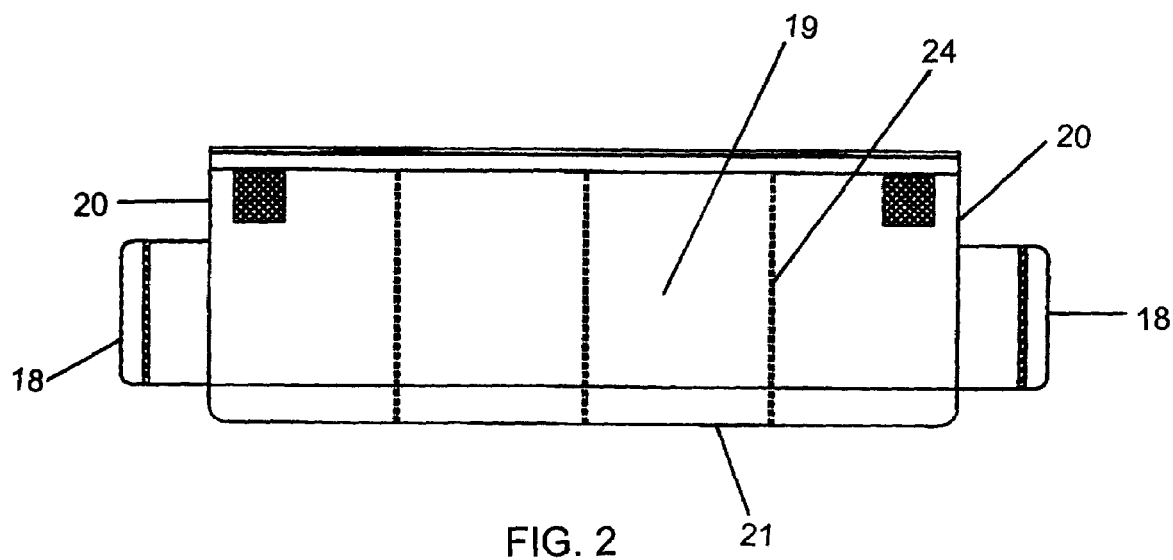
FIG. 2 is a front elevational view of the soft-sided storage compartment according to FIG. 1 in an unmounted state of the compartment.

FIG. 2 show a side view of one of the lateral walls 20 of the compartment 1. Attached to the top of the lateral walls 20 are lateral flaps 11, which may be shaped in the form of a cross. The lateral flap 11 wraps around the D-ring 51 and upper connecting plate 60 and attaches to the lateral wall 20 of the compartment with mating hook and loop strips 12 and 13, thereby wrapping around the upper D-ring 51 and the connecting plate 60 for supporting the compartment 1 on the leaning post seat 50. In order to further hold the longitudinal flaps 11, arms 14 of the longitudinal flaps 11 can be attached to the longitudinal sides of the compartment 1 using mating hook and loop strips by wrapping the arms 14 around the legs of the side frames 54.

The compartment 1 may also include support hooks or arms 15 which are disposed at the top of the compartment at each of the four corners of the compartment. The support hooks 15 can rotate about the vertical axis at the corner of the compartment 1. The rotation of the support hooks 15 allows the support hooks 15 to be disposed in a stowed position along the edge of the compartment 1 when maneuvering the bag into place on the D-ring 51. After the compartment 1 is at the appropriate height, the support hooks 15 can be rotated so as to support the bag on the D-ring 51, which allows the upper and lower longitudinal flaps 3 and 4 and the lateral flaps 11 to be properly attached without the weight of the compartment 1 and its contents interfering with the installation of the compartment 1. It is also possible for the bottom 21 to be rigid in order to help make the suspension with the support hooks 15 easier.

The compartment 1 also includes a pair of D-ring clips 16 at the top of the compartment 1 on the lateral wall 20. The D-ring clips 16 are supplied to attach a carrying strap 17 to the compartment, which allows for the easy removal of the compartment 1.

The compartment 1 may include external zippered pouches 18 on the lateral walls 20 for additional storage of items that must be easily accessible. The compartment 1 may also include internal pouches 25 on the lateral walls 20 and internal receptacles 26 on the longitudinal walls 19 for additional storage of items.

Figure 5:
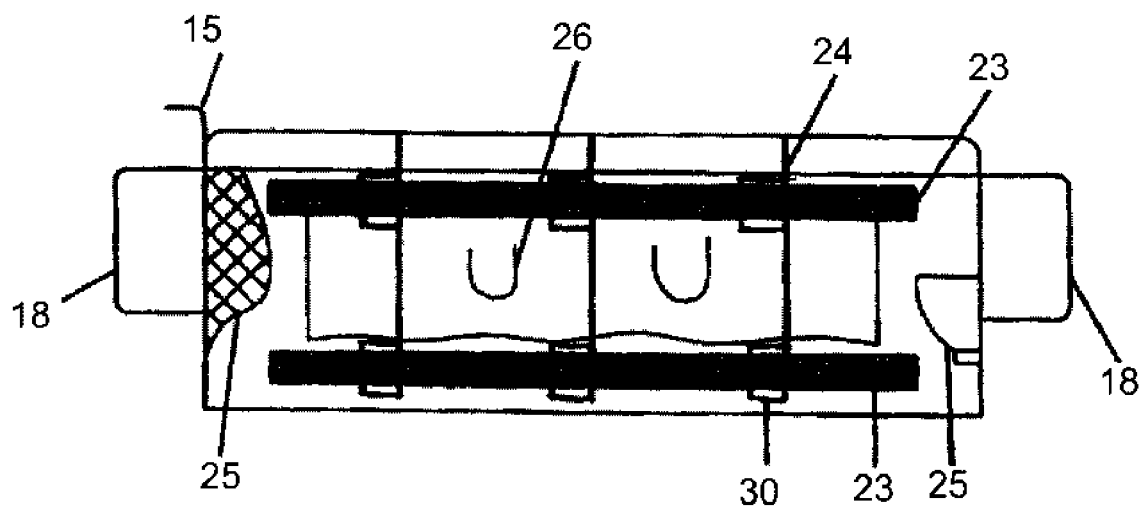
FIG. 5 is a sectional view through the compartment along line A-A according to FIG. 1 in an unmounted state of the compartment.

As seen in FIG. 5, the inside of the compartment 1 includes strips of hook and loop fasteners 23 extending along the length of the longitudinal walls 19. Partition walls 24 are disposed in the inside of the compartment and attached to the strips of hook and loop fasteners 23 with hook and loop tabs 30. This construction allows the partition walls 24 to be easily moved to segment the compartment 1 as desired.

We claim:

1. A leaning post seat assembly comprising:
   a D-ring having a D-shape and a cross tube disposed in said D-ring and defining a rectangular boundary having long sides and short sides;
   two side frames removably attached at opposite ends of said D-ring;
   a crossbar removably attached between said side frames;
   a seat cushion pivotably attached to said crossbar; and
   a soft-sided storage compartment removably attached to said rectangular boundary.

2. The leaning post assembly according to claim 1, wherein said compartment has a zipper and two zippered flaps said zipper attaching said zipper flaps to one another.

3. The leaning post assembly according to claim 2, wherein said compartment has longitudinal walls and lateral walls each of said longitudinal walls having a respective upper flap and a respective lower flap said respective upper flap and said respective lower flap wrapping around a respective one of said long sides of said D-ring and being attached to one another with releasable fasteners and each of said lateral walls having a respective lateral flap, said respective lateral flap wrapping around a respective one of short sides of said D-ring and attaching to said compartment with further releasable fasteners.

4. The leaning post assembly according to claim 2, wherein said compartment includes cover flaps disposed at ends of said zipper, said cover flaps preventing water from entering said compartment.

5. The leaning post assembly according to claim 1, further comprising a rack rod removably attached between said side frames opposite said crossbar, a footrest removably attached between said side frames below said crossbar, and a cooler strap removably attached between said side frames opposite said foot rest.

6. The leaning post assembly according to claim 5, wherein said side frames each have a respective upper connecting plate, a respective lower connecting plate, a respective tab plate, and a respective second tab plate, said D-ring has two mounting plates disposed opposite each other, each of said mounting plates being bolted to one of said respective upper connecting plates, said footrest having two end plates disposed at opposite ends of said footrest, each of said end plates being bolted to one of said respective tab plate, and said rack rod having two ear plates disposed at opposite ends of said rack rod, each of said ear plates being bolted to one of said respective second tab plate.

7. The leaning post assembly according to claim 6, further comprising a cooler strap attached between said side frames using eye straps.

8. The leaning post assembly according to claim 6, wherein said rack rod includes rod holders.

* * * * *